(12) United States Patent
Ogata et al.

(10) Patent No.: US 6,709,783 B2
(45) Date of Patent: Mar. 23, 2004

(54) BATTERY PACK COOLING STRUCTURE

(75) Inventors: Yoshiaki Ogata, Toyohashi (JP); Shinji Hamada, Toyohashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/753,571

(22) Filed: Jan. 4, 2001

(65) Prior Publication Data

US 2001/0007728 A1 Jul. 12, 2001

(30) Foreign Application Priority Data

Jan. 12, 2000 (JP) ........................................ 2000-006334

(51) Int. Cl.[7] ........................ H01M 10/50; H01M 2/18; H01M 2/00
(52) U.S. Cl. ...................... 429/120; 429/129; 429/130; 429/143; 429/148; 429/153; 429/157
(58) Field of Search ................................ 429/120, 148, 429/129, 130, 143, 153, 157

(56) References Cited

U.S. PATENT DOCUMENTS

| | | | | |
|---|---|---|---|---|
| 5,208,729 A | * | 5/1993 | Cipolla et al. ............... | 361/382 |
| 5,456,994 A | | 10/1995 | Mita | |
| 5,558,950 A | | 9/1996 | Ovshinsky et al. | |
| 5,558,958 A | * | 9/1996 | Mrotek et al. ............... | 429/146 |
| 5,569,557 A | | 10/1996 | Wagner et al. | |
| 5,580,677 A | * | 12/1996 | Morishita et al. ........... | 429/152 |
| 6,255,015 B1 | * | 7/2001 | Corrigan et al. ............ | 429/149 |

FOREIGN PATENT DOCUMENTS

| | | | | |
|---|---|---|---|---|
| DE | 4446257 | 6/1996 | | |
| EP | 0771037 | 5/1997 | | |
| EP | 0952620 | 10/1999 | | |
| EP | 0964460 | 12/1999 | | |
| JP | 3-291867 | 12/1991 | | |
| JP | 7-14616 | 1/1995 | | |
| JP | 07014616 | * 1/1995 | .......... | H01M/10/50 |
| JP | 9-199186 | 7/1997 | | |
| JP | 2000048867 A | * 2/2000 | .......... | H01M/10/50 |

OTHER PUBLICATIONS

Patent Abstracts of Japan vol. 1995, No. 4, published Jan. 17, 1999.
Patent Abstracts of Japan vol. 1997, No. 11, published Nov. 28, 1997.
English language abstract of JP 3–291867.

* cited by examiner

Primary Examiner—Patrick Ryan
Assistant Examiner—Angela J. Martin
(74) Attorney, Agent, or Firm—Greenblum & Bernstein, P.L.C.

(57) ABSTRACT

In a battery pack 1 wherein prismatic battery modules 2 are arranged parallel with each other, cooling passages 7 are formed by interposing spacers 6 made of metallic material between mutually facing long side faces 2*a*, 2*a* of the battery modules 2, 2.

4 Claims, 3 Drawing Sheets

BATTERY PACK COOLING STRUCTURE

BACKGROUND OF THE INVENTION

1. Field of the Invention

The present invention relates to a cooling structure for a battery pack constituted by arranging a plurality of prismatic battery modules parallel with each other.

2. Description of Related Art

A conventional cooling structure for a battery pack, in which a plurality of prismatic battery modules are arranged parallel with each other, is disclosed, for example, in Laid-open Japanese Patent Application No. 3-291867. With reference to FIG. 4 which illustrates the battery pack 21 according to this publication, a plurality of battery modules 22 are arranged such that their side faces of largest area face each other. The cooling medium passages 23 are formed between these battery modules 22, 22. In the illustrated example, the cooling medium passages 23 comprise horizontal grooves 24 formed over the entire length at the bottom of the cases of battery modules 22 and a plurality of spaced vertical grooves 25 extending from these horizontal grooves 24 and reaching the upper face of the case. Reference numerals 26 and 27 represent a positive terminal and a negative terminal, respectively, and reference numeral 28 represents connecting terminals whereby battery modules 22, 22 are electrically connected in series. Reference numeral 29 denotes safety vents.

In this conventional cooling structure of a battery pack, cooling medium passages 23 are formed between the battery modules 22 by providing grooves in mutually opposed side faces of the cases of battery modules 22, or, by providing mutually abutting projections such as circular protrusions or linear ribs. The battery modules 22 are cooled by means of convection currents in these cooling medium passages 23 or by forcibly passing cooling medium therethrough.

However, with such construction as shown in FIG. 4, if the area of cooling medium passages 23 is increased in the widthwise direction in order to enhance the battery cooling efficiency, the wall thickness of battery modules 22 is decreased accordingly, as a result of which sufficient wall surface strength in regard to the internal pressure of the battery cases cannot be ensured. On the other hand, if the wall thickness of the cases of the battery modules 22 is made large in order to ensure the wall strength, the cooling efficiency becomes poor, because the heat within the battery modules cannot be effectively transmitted to their outer surfaces.

SUMMARY OF THE INVENTION

In view of the foregoing, it is an object of the present invention to provide an improved cooling structure for a battery pack.

In a cooling structure according to the invention for a battery pack wherein prismatic battery modules are arranged parallel with each other in a condition such that their side faces of largest area face each other, cooling passages are formed by interposing spacers made of metallic material between the mutually opposed side faces of the battery modules.

With this battery pack cooling structure, since the spacers are made of metallic material, they can be made large for supporting the side faces of the battery modules over a wide area without compromising the heat transfer effect. Since the side walls of the battery cases are supported over a large area by the spacers, the wall thickness of the battery cases can be reduced, whereby the heat transfer effect can be enhanced. Reduction in the wall thickness in turn increases the cooling medium passage area. Thus the cooling structure of the present invention exhibits excellent cooling performance.

Preferably, the spacers are made of a sheet bent in opposite directions such that alternately protruding grooves respectively contact the opposite long side faces of the battery modules. Heat within the battery modules is thereby transferred into the cooling medium directly or through the contacting spacers having a high heat transfer coefficient, and dissipated swiftly. The pitch space between adjacent protruding grooves of the spacers is set relatively small, so that the side faces of the battery cases are supported over a wide area with sufficient strength. In this way, the wall thickness of the side faces of the battery cases can be made small, while maintaining sufficient support for the battery cases. Furthermore, the width of the cooling medium passages can be made large to the extent that the wall thickness is reduced, whereby the cooling efficiency is remarkably enhanced.

The spacers can be made of corrugated sheet having a wavy cross-section, or of extrusion moldings or pultrusion moldings formed with grooves or cavities constituting the cooling medium passages.

The spacers are preferably made of aluminum or aluminum alloy, because it exhibits high heat transfer performance and has other advantageous properties such as light weight and good ductility. Any other materials that have similar properties can of course be employed.

While novel features of the invention are set forth in the preceding, the invention, both as to organization and content, can be further understood and appreciated, along with other objects and features thereof, from the following detailed description and examples when taken in conjunction with the attached drawings.

DESCRIPTION OF THE PREFERRED EMBODIMENTS

Figure 1:
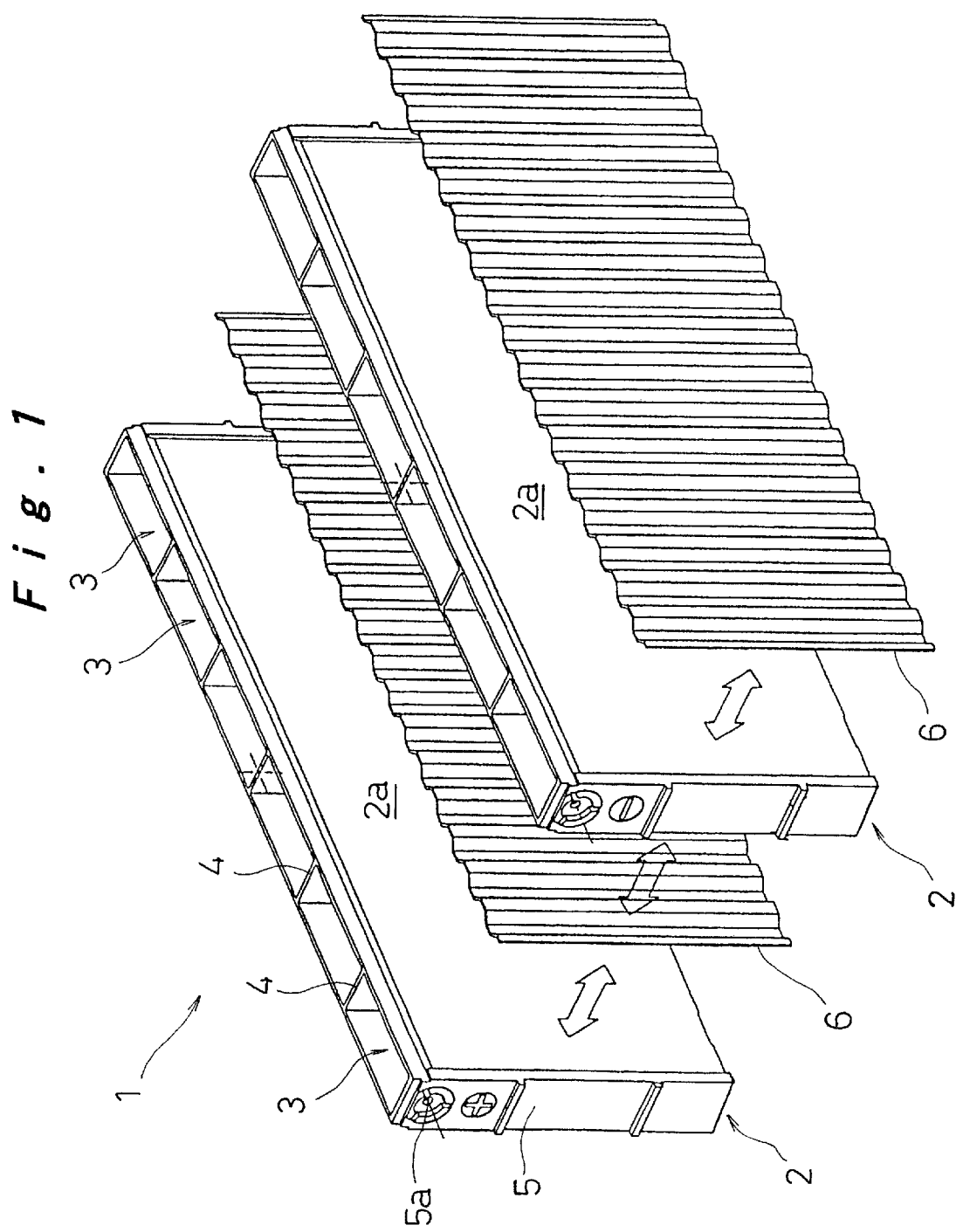
FIG. 1 is an exploded partial perspective view of an embodiment of a cooling structure for a battery pack according to the present invention.
Figure 2:
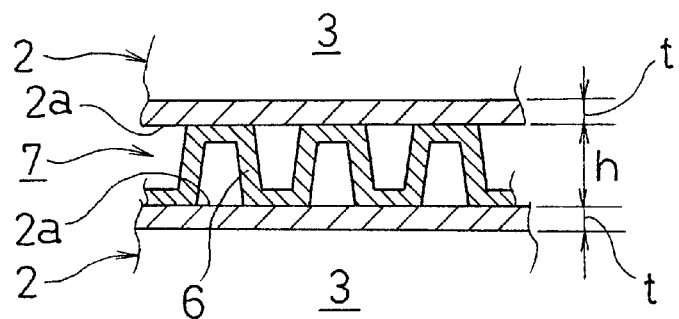
FIG. 2 is a transversely sectioned plan view of major parts of the above embodiment.

With reference to FIG. 1 and FIG. 2, the present invention is embodied as a battery pack 1 suitable for use as the drive power source of an electric vehicle, comprising a plurality of prismatic flat battery modules 2 constituted by nickel metal hydride batteries, arranged parallel to each other. These battery modules 2 are tightly tied together by a plurality of restraining bands (not shown), and unified as a battery pack 1 by end plates thereof (not shown) which are arranged at both ends in the direction of this parallel arrangement.

Each battery module 2 consists of an integral case formed by mutually integrally connecting a plurality (six in this embodiment) of prismatic battery cases 3 having short side faces and long side faces, the short side faces constituting partitions 4 between adjacent battery cases 3, 3, and being shared. The short side faces on the outside of the two end battery cases 3 form the end walls 5 of the integral battery case. Each of the battery cases 3 accommodates therein electrode plate groups and electrolyte, thereby constituting respective cells. The electrode plate groups are made up of a large number of positive electrode plates and negative electrode plates stacked alternately in the direction of the short side faces and parallel with the long side faces of battery cases 3, with intervening separators therebetween. Battery modules 2 are constituted by connecting these six cells in series within the integral battery case, connecting terminals (not shown) being connected to the top edges of the end walls 5 of the two end cells. Reference numeral 5a denotes installation holes for these connecting terminals. The upper ends of the integral battery case are closed by joining covers (not shown) integrally therewith.

The long side faces 2a of battery modules 2 facing each other are formed as smooth planar faces. The wall thickness t is set to be thinner than conventionally. Specifically, whereas in the prior art t=1.5 mm, in this embodiment it is set to t=1.0 mm. Spacers 6 made of an aluminum or aluminum alloy sheet formed with alternating square furrows and ridges by press forming are interposed between the long side faces 2a, 2a of these battery modules 2, so that cooling medium passages 7 are formed between the long side faces 2a, 2a of battery modules 2 as shown in FIG. 2.

Since the long side faces 2a of battery modules 2 are supported by the spacers 6 made of metallic sheet material, the cooling performance can be ensured owing to the high heat transfer coefficient of the metal.

That is, since the entire surface of the side faces of battery cases 3 contacts the cooling medium directly or through the intermediary of the sheet material, which has a high heat transfer coefficient, battery modules 2 are efficiently cooled. The heat of battery cases 3 is transferred into the cooling medium passages 7 through the sheet material and is removed into the cooling medium which is not in direct contact with the side faces of the battery cases 3. Thus high cooling performance is obtained.

The spacers 6 are made of a sheet bent in opposite directions such that alternately protruding grooves or ridges respectively contact the opposite long side faces of the battery modules. The pitch space between adjacent protruding grooves or ridges of the spacers is set relatively small, so that the side faces of the battery cases are supported over a side area with sufficient strength. In this way, the wall thickness t of the long side faces 2a of battery modules can be made thin without compromising the wall strength. In addition, the width h of the cooling passages 7 can be made large to the extent that the wall thickness t is reduced, whereby even higher cooling performance can be achieved. To be more specific, while the sheet thickness of the sheet material constituting the spacers 6 is for example 0.5 mm, the width h of cooling medium passages 7 is 2.3 mm. In the prior art example described in the foregoing, since the wall thickness of the battery cases was about 1.5 mm as noted above, the width of the cooling medium passages was about 1.8 mm. Therefore, provided that the pitch space of the battery modules 2 arranged in parallel is the same, the width of the cooling passages can be made much larger according to the present invention.

The spacers 6 are made of aluminum or aluminum alloy, having a high heat transfer coefficient, whereby high cooling performance is ensured. Also, aluminum or aluminum alloy is beneficial in that it is light-weighted and can be processed easily. It should be noted that any other materials having similar properties can be employed for the spacers 6.

Figure 3A:
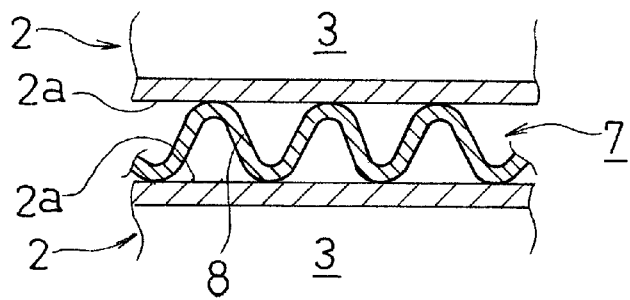
FIG. 3A and FIG. 3B are transversely sectioned plan views of major parts of other embodiments of the cooling structure for a battery pack according to the present invention.
Figure 3B:
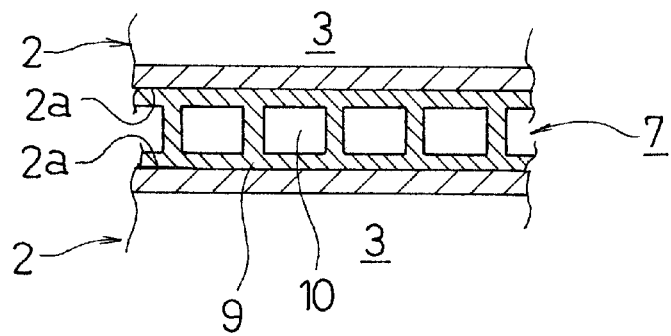
Figure 4:
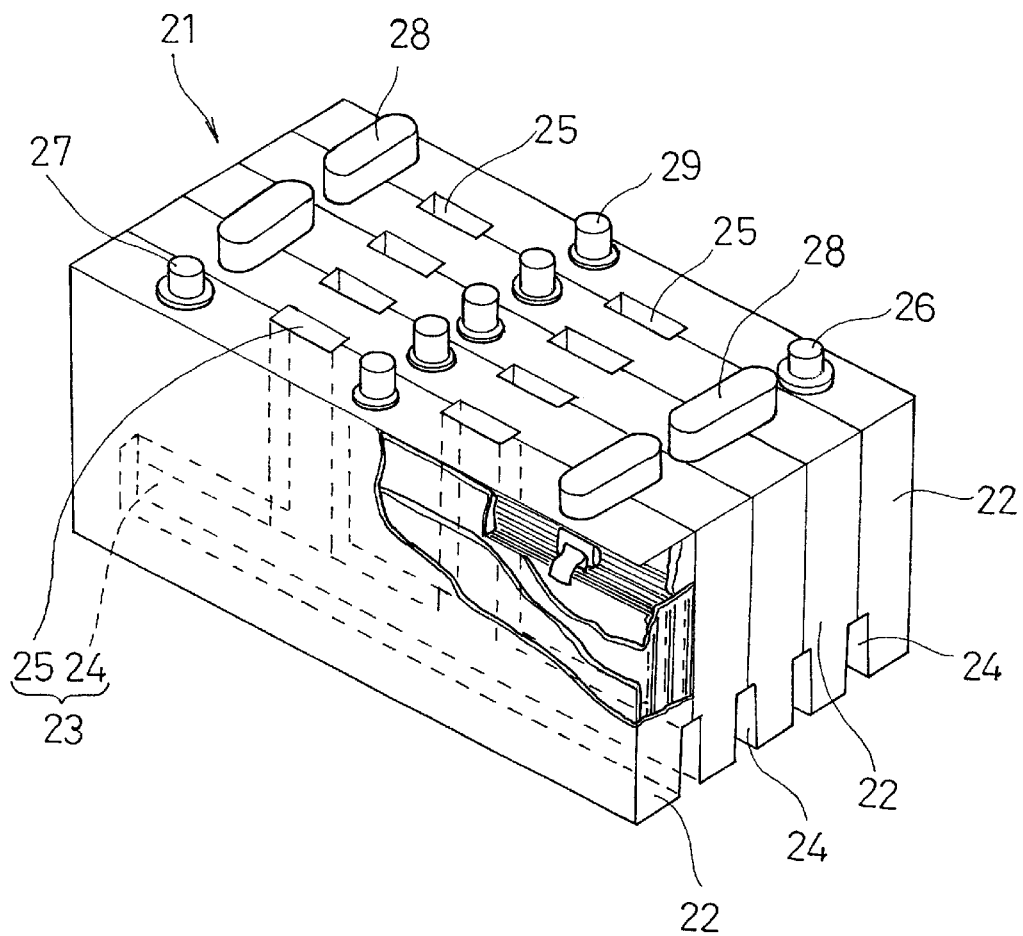
FIG. 4 is a perspective view of the cooling structure of an example prior art battery pack.

Instead of the spacers 6 having a square wave cross section, a spacer 8 made of corrugated sheet material having a sinuous cross section as shown in FIG. 3A, can be employed. Whether angular or curved, such corrugated sheet can be obtained by press-forming. Alternatively, as shown in FIG. 3B, a spacer 9 can be employed made of an extrusion molding or pultrusion molding with cavities 10 constituting cooling medium passages formed in its interior. It should go without saying that the spacers 6, 8 shown in the foregoing embodiment or FIG. 3A could also be constructed of extrusion moldings or pultrusion moldings.

As will be clear from the above description, the present invention provides an improved cooling structure for a battery pack, wherein cooling medium passages are formed by interposing spacers made of metallic material between mutually opposite faces of the battery modules. The spacers made of a material having a high heat transfer coefficient provide support for the battery cases, as well as contribute to good cooling performance.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A cooling structure for a battery pack, wherein prismatic battery modules are arranged parallel with each other such that their side faces of largest area face each other, comprising:

a plurality of spacers made of a metallic material and interposed between mutually opposed side faces of the battery modules, said plurality of spacers being configured such as to form cooling medium passages between the battery modules;

wherein the spacers are made of aluminum or aluminum alloy.

2. The cooling structure for a battery pack according to claim 1 wherein the spacers are made of a sheet material formed with alternating angular ridges and grooves.

3. The cooling structure for a battery pack according to claim 1 wherein the spacers are made of a sheet material formed with alternating curved ridges and grooves.

4. The cooling structure for a battery pack according to claim 1 wherein the spacers are made of extrusion or pultrusion moldings formed with grooves or cavities constituting the cooling medium passages.

* * * * *